(12) United States Patent
Konrad et al.

(10) Patent No.: US 8,716,380 B2
(45) Date of Patent: May 6, 2014

(54) POLYCARBONATE COMPOSITION HAVING IMPROVED HEAT STABILITY

(75) Inventors: Stephan Konrad, Dormagen (DE); Heinrich Hähnsen, Duisburg (DE); Karl-Heinz Köhler, Aachen-Brand (DE); Marc Buts, Duffel (BE); Daniel Koch, Shanghai (CN); Frank Guldentops, Shanghai (CN)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 12/893,126

(22) Filed: Sep. 29, 2010

(65) Prior Publication Data

US 2011/0130500 A1 Jun. 2, 2011

(30) Foreign Application Priority Data

Sep. 30, 2009 (DE) .................. 10 2009 043 509

(51) Int. Cl.
*C08K 5/50* (2006.01)
(52) U.S. Cl.
USPC ........................................ 524/154; 524/140
(58) Field of Classification Search
USPC ................................ 524/154, 140
See application file for complete search history.

(56) References Cited

U.S. PATENT DOCUMENTS

| | | | |
|---|---|---|---|
| 5,362,783 A | 11/1994 | Eiffler et al. | |
| 5,391,690 A * | 2/1995 | Kanno et al. | 528/198 |
| 5,811,478 A * | 9/1998 | Rex et al. | 524/115 |
| 6,680,350 B1 * | 1/2004 | Dobler | 524/88 |
| 2003/0022967 A1 | 1/2003 | Dobler et al. | |
| 2003/0031844 A1 | 2/2003 | Gorny et al. | |
| 2003/0134988 A1 * | 7/2003 | Asano et al. | 525/330.6 |
| 2003/0139503 A1 * | 7/2003 | Dobler et al. | 524/165 |
| 2004/0260049 A1 * | 12/2004 | Miyamoto et al. | 528/88 |
| 2005/0215750 A1 * | 9/2005 | Koga et al. | 528/196 |
| 2007/0129489 A1 * | 6/2007 | Li et al. | 525/67 |
| 2011/0003945 A1 | 1/2011 | Wehrmann et al. | |
| 2011/0195222 A1 | 8/2011 | Nakagawa et al. | |

FOREIGN PATENT DOCUMENTS

| | | |
|---|---|---|
| DE | 4419897 A1 | 12/1994 |
| DE | 102009043513 A1 | 3/2011 |
| EP | 0559953 A2 | 9/1993 |
| EP | 1266931 A1 | 12/2002 |
| EP | 1808462 A1 | 7/2007 |
| EP | 2009057 A1 | 12/2008 |
| WO | WO-02085613 A2 | 10/2002 |
| WO | WO-2009106246 A1 | 9/2009 |

* cited by examiner

*Primary Examiner* — Peter Szekely
(74) *Attorney, Agent, or Firm* — Novak Druce Connolly Bove + Quigg LLP

(57) ABSTRACT

The invention relates to a polycarbonate composition having reduced subsequent yellowing of the mouldings produced therefrom on heat ageing and having good optical properties of the polycarbonate composition on processing.

13 Claims, No Drawings

US 8,716,380 B2

POLYCARBONATE COMPOSITION HAVING IMPROVED HEAT STABILITY

RELATED APPLICATIONS

This application claims benefit to German Patent Application No. 10 2009 043 509.3, filed Sep. 30, 2009, which is incorporated herein by reference in its entirety for all useful purposes.

BACKGROUND OF THE INVENTION

The invention relates to a polycarbonate composition having reduced subsequent yellowing of the mouldings produced therefrom on heat ageing and having good optical properties of the polycarbonate composition on processing.

The invention relates in particular to compositions comprising polycarbonate with an aromatic phosphine and a sterically hindered phenol, the polycarbonate being prepared from bisphenols and organic carbonates by the transesterification process in the melt, referred to below as "melt polycarbonate".

In addition to its good mechanical properties, polycarbonate is distinguished, inter alia, by high transparency and brilliance of colour. One possibility for assessing the brilliance of colour is the so-called yellowness index (YI), which characterizes the degree of yellowing of the material. For high-quality polycarbonate, a low YI value is an important quality feature. Uses of polycarbonate based on bisphenol A (BPA) extend over a wide temperature range from −100° C. to about +135° C. Particularly in the case of heat ageing, i.e. on storage of mouldings at elevated temperatures of use of >100° C. over relatively long periods of weeks or months in air, polycarbonate shows so-called subsequent yellowing with increasing temperature, i.e. an increase in the YI value with time. Below, subsequent yellowing (ΔYI) designates the difference between the degree of yellowing of a moulding after heat ageing, measured as the YI value on the standard body according to ASTM D-1925, and the degree of yellowing (as YI value) of a freshly injection-moulded moulding.

A low YI value is of considerable importance both during production and in subsequent use. For colour-critical applications of polycarbonate, it is therefore desirable to produce polycarbonate mouldings having low initial YI values and to achieve as little subsequent yellowing as possible during the subsequent use under conditions of heat ageing. Subsequent yellowing occurs, for example, in the case of headlamp diffuser screens made of polycarbonate, which are exposed to continuous temperature loads of above 100° C., depending on size and design. Such applications require a material whose optical properties are substantially unchanged at a high level and which decline as little as possible over the operating time.

Polycarbonate can be prepared by various processes. The polycarbonate prepared by the interfacial process from bisphenols and phosgene in solution (IPC) first acquired industrial importance. In the transesterification process which is becoming increasingly important today, bisphenols are reacted with organic carbonates in the melt to give so-called melt polycarbonate (MPC).

This melt polycarbonate (MPC) has many differences compared with the polycarbonate prepared in interfacial process (IPC). One difference of the MPC is the more pronounced subsequent yellowing, in particular on heat ageing; which is due to higher values of the phenolic OH terminal groups. The branching structures which are present in the MPC and lead to poorer initial colours and, on heat ageing, to greater subsequent yellowing constitute another difference.

A basic possibility for minimizing the subsequent yellowing of polycarbonate is the use of heat stabilizers. The technical state of the art for heat stabilization of polycarbonate comprises substantially the use of suitable organic phosphorus compounds aromatic phosphines, aromatic phosphites, and organic antioxidants, in particular sterically hindered phenols. Frequently, the use of phosphites in combination with sterically hindered phenols is described. However, the prior art provides no information about the long-term stabilization, especially of melt polycarbonate mouldings, to heat ageing in atmospheric oxygen on use at temperatures greater than 100° C. over several weeks and months.

German Offenlegungsschrift [German Offenlegungsschrift] DE 44 19 897 A1 is concerned with the stabilization of polycarbonate, prepared by the interfacial process, to discolouration at high temperatures at 300° C. In this document, a mixture of a phosphine and a hindered phenol is mentioned as a suitable stabilizer combination for polycarbonate compositions based on polycarbonate prepared by the interfacial process. The estimate of the colour change of the mouldings is made only after the process step of the moulding materials to the mouldings, i.e. in the freshly injection-moulded state. However, the disclosure document makes no mention of so-called heat ageing, where the extruded polycarbonate compositions and the mouldings produced therefrom are exposed over a relatively long time to elevated temperature and the presence of atmospheric oxygen. The extent of any subsequent yellowing in the context of the present invention cannot be derived therefrom. In fact, there is no correlation between the thermal storage in air and the yellowness index YI zero value of the freshly injection-moulded mouldings.

It is very clear from the disclosure that the polycarbonate is one prepared by the interfacial process from phosgene and bisphenols. Such so-called solution polycarbonates (IPC) have different behaviour compared with so-called melt polycarbonates (MPC), as already indicated above, since the polycarbonates prepared by the MPC process have structures which are not present in an IPC. IPC therefore has less tendency towards colour changes under thermal load, in particular on relatively long heat ageing, than melt polycarbonates. It is therefore to be expected that an MPC will behave differently from an IPC on heat ageing.

The European Patent Application EP 559 953 A2 mentions a mixture of organic phosphorus compounds with sterically hindered phenols as a heat stabilizer mixture in the synthesis of such melt polycarbonates. In particular, phosphorus-oxygen compounds, such as, for example, phosphites, are mentioned as suitable phosphorus compounds. Pure phosphorus-carbon compounds, such as, for example, phosphines (phosphanes), in particular triphenylphosphine, are not disclosed as being suitable.

There is therefore a need for suitable melt polycarbonate moulding materials which both have little natural colouration (low YI value) after processing to give mouldings and show no significant subsequent yellowing (delta YI value, ΔYI) on heat ageing, as described above.

Surprisingly, however, it was found that in particular combinations of phosphines with sterically hindered phenols have a substantially better heat-stabilizing effect in melt polycarbonate moulding materials than combinations of phosphites with sterically hindered phenols. These MPC moulding materials according to the invention which contain a combination preferably of a phosphine with a sterically hindered phenol show reduced subsequent yellowing, in particular on heat ageing.

Embodiments of the Invention

An embodiment of the present invention is a composition comprising a melt polycarbonate, at least one phosphine, and n-octadecyl-3-(3,5-di-tert-butyl-4-hydroxyphenyl)propionate, wherein said at least one phosphine is a compound of formula (I):

$$Ar_1\text{—}P(R')\text{—}Ar_2 \quad (I)$$

wherein $Ar_1$ and $Ar_2$ are, identically or differently, optionally substituted aryl radicals, and R' is an optionally substituted aryl radical or a radical of formula (Ia) to (Ih)

$$-(CH_2)_n\text{—}P(R)(R) \quad (Ia)$$

$$-(CH_2)_n\text{—}P(R)\text{—}(CH_2)_m\text{—}P(R)(R) \quad (Ib)$$

$$-CH\text{=}CH\text{—}P(R)(R) \quad (Ic)$$

$$-C\text{≡}C\text{—}P(R)(R) \quad (Id)$$

$$-Ar\text{—}P(R)(R) \quad (Ie)$$

where Ar = R ($C_6$—$C_{14}$-aryl radical)

$$\begin{array}{c} CH_3\diagdown C \diagup CH_3 \\ O \quad O \\ -CH_2\text{—}CH\text{—}CH\text{—}CH_2\text{—}P(R)(R) \end{array} \quad (If)$$

(Ig) [binaphthyl structure with $PR_2$ groups]

-continued $$\begin{array}{c} (CH_2)_n\text{—}P(R)(R) \\ -(CH_2)_m\text{—}C\text{—}(CH_2)_m\text{—}H \\ (CH_2)_n\text{—}P(R)(R) \end{array} \quad (Ih)$$

wherein

R is an optionally substituted $C_6$-$C_{14}$-aryl radical, n and m are, independently of one another, an integer from 1 to 7, wherein the H atoms of the radicals of formula (Ia) to (Ic) are optionally replaced by substituents, and with the proviso that R' is optionally an optionally substituted 4-phenylphenyl or an optionally substituted α-naphthyl if Ar in formula (I) is in both cases likewise an optionally substituted 4-phenylphenyl or an optionally substituted α-naphthyl.

Another embodiment of the present invention is the above composition, further comprising at least one alkyl phosphate, wherein said at least one alkyl phosphate is a compound of formula (II):

$$R_3O\diagdown P(=O)(OR_1)\diagup OR_2 \quad (II)$$

wherein $R_1$, $R_2$, and $R_3$ are, identically or differently, H or a linear, branched, or cyclic alkyl radical.

Another embodiment of the present invention is the above composition, wherein said melt polycarbonate comprises a melt polycarbonate of formula (IV)

$$Y\text{—}[O\text{—}M\text{—}O\text{—}C(=O)]_n\text{—}OY \quad (IV)$$

wherein the square brackets designate repeating structural units,

M is Ar, a polyfunctional compound A, B, or C, or a compound D, wherein Ar is optionally a compound of formula (VIII) or (IX)

(VIII) [aryl structure with $(R_{13})_r$]

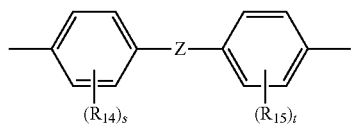

(IX)

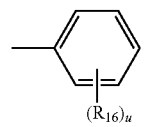

(X)

wherein

R$_{16}$ is, identically or differently, H, C$_1$- to C$_{20}$-alkyl, C$_6$H$_5$, or C(CH$_3$)$_2$C$_6$H$_5$ and u is 0, 1, 2 or 3.

Another embodiment of the present invention is the above composition, wherein said optionally substituted C$_1$-C$_{18}$ alkyl radical is a phenyl, methyl, propyl, ethyl, or butyl group, each of which is optionally substituted.

Another embodiment of the present invention is the above composition, wherein said composition further comprises at least one phosphine oxide corresponding to said at least one phosphine of formula (I).

Another embodiment of the present invention is the above composition, wherein said at least one phosphine of formula (I) is triphenylphosphine.

Another embodiment of the present invention is the above composition, wherein said at least one phosphine of formula (I) is employed in an amount of from 10 to 2000 mg/kg, based on the total weight of said composition.

Another embodiment of the present invention is the above composition, wherein said at least one alkyl phosphate is employed in an amount of from 0.5 to 500 mg/kg, based on the total weight of said composition.

Another embodiment of the present invention is the above composition, wherein n-octadecyl-3-(3,5-di-tert-butyl-4-hydroxyphenyl)propionate is employed in an amount of from 10 to 800 mg/kg, based on the total weight of the composition.

Another embodiment of the present invention is the above composition, wherein said composition has a subsequent yellowing ΔYI, after storage for 1000 hours at 135° C. in air, of less than 4.8.

Yet another embodiment of the present invention is a process for preparing the above composition, comprising preparing said melt polycarbonate via the melt transesterification reaction of a bisphenol and a carbonic acid diester.

Another embodiment of the present invention is the above process, comprising preparing said melt polycarbonate via the condensation of carbonate oligomers comprising hydroxyl and/or carbonate terminal groups, bisphenols, and carbonic diesters.

Another embodiment of the present invention is the above process, comprising adding an additive to the melt of a polycarbonate melt stream via a side extruder behind the last polycondensation step of a multi-step polycondensation to form a mixture and mixing said mixture in a static mixer.

Another embodiment of the present invention is the above process, comprising adding a prepared mixture of said phosphine with n-octadecyl-3-(3,5-di-tert-butyl-4-hydroxyphenyl)propionate to the melt of a polycarbonate melt stream via a side extruder prior to the last polycondensation step of a multi-step polycondensation to form a mixture and mixing said mixture in a static mixer.

Another embodiment of the present invention is the above process, wherein said mixture is added in liquid form.

Yet another embodiment of the present invention is a moulding comprising the above composition.

wherein

Z is C$_1$- to C$_8$-alkylidene, C$_5$- to C$_{12}$-cycloalkylidene, S, SO$_2$, or a single bond, R$_{13}$, R$_{14}$, and R$_{15}$
  are, independently of one another, an optionally substituted C1-C18 alkyl radical, Cl, or Br, n is 0, 1, or 2, r, s, and t
  are, independently of one another, 0, 1, 2, or 3, polyfunctional compound A is a compound of formula

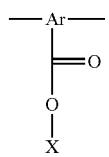

(A)

polyfunctional compound B is a compound of formula

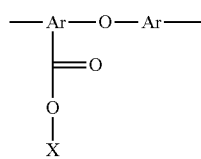

(B)

polyfunctional compound C is a compound of formula

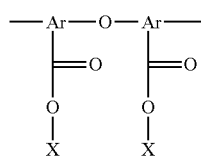

(C)

compound D is a compound of formula

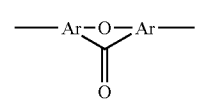

(D)

wherein the sum of said polyfunctional compounds A, B, and C and compound D is greater than or equal to 5 mg/kg, X is Y or —[MOCOO]$_n$—Y, Y is H or a compound of formula (X)

DESCRIPTION OF THE INVENTION

The invention therefore relates to a melt polycarbonate composition which contains a melt polycarbonate, a phosphine and a sterically hindered phenol. This MPC composition may optionally additionally contain an organic phosphoric acid ester, preferably an alkyl phosphate.

Phosphines used according to the invention are compounds of the general formula (I):

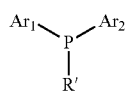
(I)

in which Ar$_1$ and Ar$_2$ are identical or different unsubstituted or substituted aryl radicals and R' is an unsubstituted or substituted aryl radical or one of the following radicals (Ia) to (Ih)

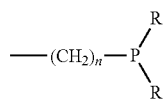
(Ia)

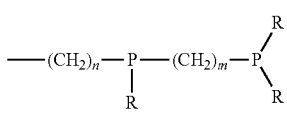
(Ib)

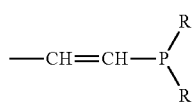
(Ic)

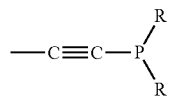
(Id)

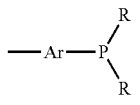
(Ie)

where Ar = R
(C$_6$—C$_{14}$-aryl radical)

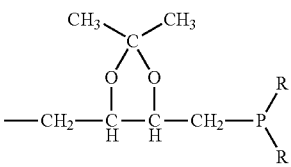
(If)

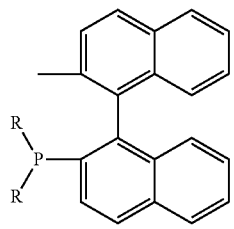
(Ig)

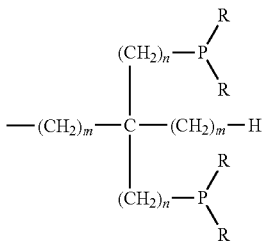
(Ih)

in which R is an unsubstituted or substituted C$_6$-C$_{14}$-aryl radical and "n" and "m", in each case independently of one another, are an integer from 1 to 7, it also being possible for the H atoms of the radicals (Ia) to (Ic) to be replaced by substituents, it also being possible for R' to be 4-phenylphenyl or α-naphthyl if Ar in formula (I) is in both cases likewise 4-phenylphenyl or α-naphthyl. Here, the 4-phenylphenyl and the α-naphthyl radicals may also carry substituents.

Preferred radicals Ar in (I) are phenyl, 4-phenylphenyl and naphthyl.

Suitable substituents of the aryl radicals Ar in (I) are F, CH$_3$, Cl, Br, I, OCH$_3$, CN, OH, alkylcarboxyl, phenyl, cycloalkyl, alkyl.

Suitable substituents for the H atoms of the radicals (Ia) to (Ic) are F, CH$_3$, alkyl, cycloalkyl, Cl, aryl.

Preferred numbers "n" and "m" are 1, 2, 3 or 4.

Aryl, in each case independently, represents an aromatic radical having 4 to 24 skeletal carbon atoms, in which no skeletal carbon atom, one skeletal carbon atom or two or three skeletal carbon atoms per cycle (aromatic ring comprising C atoms) in the total molecule, but at least one skeletal carbon atom, may be substituted by heteroatoms selected from the group consisting of nitrogen, sulphur or oxygen. Preferably, however, aryl denotes a carbocyclic aromatic radical having 6 to 24 skeletal carbon atoms. The same applies to the aromatic moiety of an arylalkyl radical and to aryl constituents of more complex groups (such as, for example, arylcarbonyl or arylsulphonyl radicals).

Examples of C$_6$-C$_{24}$-aryl are phenyl, o-, p- or m-tolyl, naphthyl, phenanthrenyl, anthracenyl or fluorenyl. Examples of heteroaromatic C$_4$-C$_{24}$-aryl in which no skeletal carbon atom, one skeletal carbon atom or two or three skeletal carbon atoms per cycle in the total molecule but at least one skeletal carbon atom may be substituted by heteroatoms selected from the group consisting of nitrogen, sulphur or oxygen are, for example, pyridyl, pyridyl N-oxide, pyrimidyl, pyridazinyl, pyrazinyl, thienyl, furyl, pyrrolyl, pyrazolyl, imidazolyl, thiazolyl, oxazolyl or isoxazolyl, indolizinyl, indolyl, benzo[b]thienyl, benzo[b]furyl, indazolyl, quinolyl, isoquinolyl, naphthyridinyl, quinazolinyl, benzofuranyl or dibenzofuranyl.

Phosphines suitable according to the invention are, for example, triphenylphosphine, tritolylphosphine, tri-p-tert-butylphenylphosphine or the oxides thereof. Preferably used phosphine is triphenylphosphine.

Examples of the diarylphosphines to be used according to the invention are 1,2-bis(dipentafluorophenylphosphino)ethane,
bis(diphenylphosphino)acetylene,
1,2-bis-(diphenylphosphino)benzene,

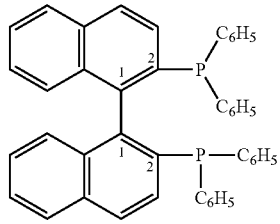

[2,2'-bis(diphenylphosphino)-1,1'-binaphthyl], 2,3-bis(diphenylphosphino)butane, 1,4-bis-(diphenylphosphino)butane, 1,2-bis(diphenylphosphino)ethane, cis-1,2-bis(diphenylphosphino)ethylene.

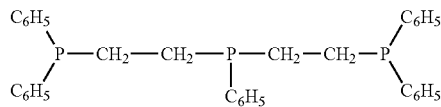

[bis(2-(diphenylphosphino)ethyl)phenylphosphine], bis(diphenylphosphino)methane, 2,4-bis-(diphenylphosphino)pentane, 1,3-bis(diphenylphosphino)propane, 1,2-bis(diphenylphosphino)propane,

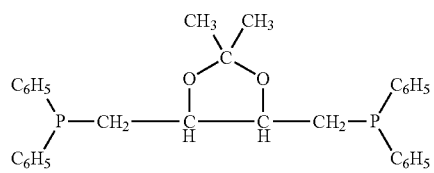

[4,5-O-isopropylidene-2,3-dihydroxy-1,4-bis(diphenylphosphino)butane], tri(4-diphenyl)phosphine and tris(α-naphthyl)phosphine.

The diarylphosphines can be prepared according to the following literature instructions:
Issleib et al., Chem. Ber., 92 (1959), 3175-3182, and Hartmann et al., Zeitschr. Anorg. Ch. 287 (1956) 261-272.

It is also possible to use mixtures of different phosphines. The phosphines used are employed in amounts of 10 to 2000 mg/kg, preferably of 30 to 800 mg/kg, particularly preferably of 50 to 500 mg/kg, based on the total weight of the composition.

The moulding materials according to the invention may also contain the corresponding phosphine oxides in addition to the phosphines used.

Alkyl phosphates optionally used according to the invention are compounds of the general formula (II):

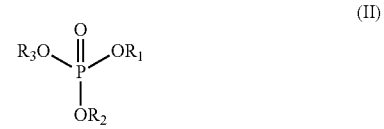

in which $R_1$ to $R_3$ may be H, identical or different linear, branched or cyclic alkyl radicals. $C_1$-$C_{18}$-alkyl radicals are particularly preferred. $C_1$-$C_{18}$-alkyl represents, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, cyclohexyl, cyclopentyl, n-hexyl, 1,1-dimethylpropyl, 1,2-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl or 1-ethyl-2-methylpropyl, n-heptyl and n-octyl, pinacyl, adamantyl, the isomeric menthyls, n-nonyl, n-decyl, n-dodecyl, n-tridecyl, n-tetradecyl, n-hexadecyl or n-octadecyl.

Alkyl phosphates suitable according to the invention are, for example, mono-, di- and trihexyl phosphate, triisooctyl phosphate and trinonyl phosphate. Triisooctyl phosphate (tris-2-ethylhexyl phosphate) is preferably used as the alkyl phosphate. It is also possible to use mixtures of different mono-, di- and trialkyl phosphates. The alkyl phosphates used are employed in amounts of less than 500 mg/kg, preferably of 0.5 to 500 mg/kg, particularly preferably 2 to 500 mg/kg, based on the total weight of the composition.

Possible sterically hindered phenols are, for example, esters of β-(3,5-di-tert-butyl-4-hydroxyphenyl)propionic acid or β-(5-tert-butyl-4-hydroxy-3-methylphenyl)propionic acid or β-(3,5-dicyclohexyl-4-hydroxyphenyl)propionic acid with mono- or polyhydric alcohols, for example with methanol, ethanol, butanol, n-octanol, isooctanol, n-octadecanol, 1,6-hexanediol, 1,9-nonanediol, ethylene glycol, 1,2-propanediol, neopentylglycol, diethylene glycol, triethylene glycol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

n-Octadecyl 3-(3,5-di-tert-butyl-4-hydroxyphenyl)propionate is particularly suitably used as the sterically hindered phenol. The sterically hindered phenol is preferably used in amounts of 10 to 800 mg/kg, particularly preferably of 30 to 500 mg/kg, very particularly preferably of 40 to 400 mg/kg, based on the total weight of the composition.

The polycarbonate to be used according to the invention is prepared by the melt transesterification reaction of suitable bisphenols and diaryl carbonates in the presence of a suitable catalyst. The preparation of aromatic polycarbonates by the melt transesterification process is known and is described, for example, in "Schnell", Chemistry and Physics of Polycarbonates, Polymer Reviews, Vol. 9, Interscience Publishers, New York, London, Sydney 1964, in D.C. Prevorsek, B. T. Debona and Y. Kersten, Corporate Research Center, Allied Chemical Corporation, Moristown, N.J. 07960, "Synthesis of Poly(ester)carbonate Copolymers" in Journal of Polymer Science, Polymer Chemistry Edition, Vol. 19, 75-90 (1980), in D. Freitag, U. Grigo, P. R. Mëller, N. Nouvertne, BAYER AG, "Polycarbonates" in Encyclopedia of Polymer Science and Engineering, Vol. 11, Second Edition, 1988, pages 648-718, and finally in Des. U. Grigo, K. Kircher and P. R. Müller, "Polycarbonate" in Becker/Braun, Kunststoff-Handbuch [Plastics Handbook], Volume 3/1, Polycarbonate, Polyacetale, Polyester, Celluloseester [Polycarbonates, Polyacetals, Polyesters, Cellulose esters], Carl Hanser Verlag Munich, Vienna 1992, pages 117-299.

The polycarbonate may also be prepared by the condensation of carbonate oligomers, which contain hydroxyl and/or carbonate terminal groups, and suitable diaryl carbonates and bisphenols. Preferred carbonate oligomers are described by the formula (IV), with molecular weights of 153 to 15 000 [g/mol].

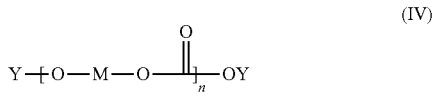

(IV)

in which Y is H or an unsubstituted or substituted aryl radical.

Suitable diaryl carbonates in the context of the invention are di-$C_6$— to di-$C_{1-4}$-aryl esters, preferably the diesters of phenol or of alkyl- or aryl-substituted phenols, i.e. diphenyl carbonate, dicresyl carbonate and di-4-tert-butylphenyl carbonate. Diphenyl carbonate is most preferred.

The suitable di-$C_6$- to di-$C_{14}$-aryl esters also include asymmetrical diaryl esters which contain two different aryl substituents. Phenyl cresyl carbonate and 4-tert-butylphenyl phenyl carbonate are preferred.

The suitable diaryl esters also include mixtures of more than one di-$C_6$-$C_{14}$-aryl ester. Preferred mixtures are mixtures of diphenyl carbonate, dicresyl carbonate and di-4-tert-butylphenyl carbonate.

The diaryl carbonates can be used in amounts of 1.00 to 1.30 mol, particularly preferably in amounts of 1.02 to 1.20 mol and most preferably in amounts of 1.05 to 1.15 mol, based on 1 mol of diphenol.

Suitable dihydroxyaryl compounds in the context of the invention are those which correspond to the formula (V):

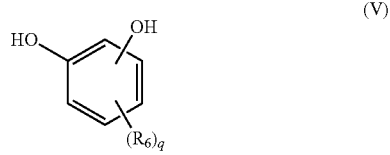

(V)

in which $R_6$ is a substituted or unsubstituted phenyl, methyl, propyl, ethyl, butyl, Cl or Br and q represents 0, 1 or 2.

Preferred dihydroxybenzene compounds are 1,3-dihydroxybenzene, 1,4-dihydroxybenzene and 1,2-dihydroxybenzene.

Suitable dihydroxydiaryl compounds in the context of the invention are those which correspond to the formula (VI):

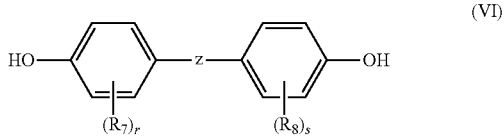

(VI)

in which

Z is $C_1$- to $C_8$-alkylidene or $C_5$- to $C_{12}$-cycloalkylidene, S, $SO_2$ or a single bond, $R_7$, $R_8$ independently of one another, are substituted or unsubstituted phenyl, methyl, propyl, ethyl, butyl, Cl or Br and r, s independently of one another, represents 0, 1 or 2.

Preferred diphenols are 4,4'-dihydroxybiphenyl, 4,4'-dihydroxybiphenyl sulphide, 1,1-bis(4-hydroxyphenyl)cyclohexane, 1,2-bis(4-hydroxyphenyl)benzene, 1,3-bis(4-hydroxyphenyl)benzene, 1,4-bis(4-hydroxyphenyl)benzene, bis(4-hydroxyphenyl)methane, 2,2-bis(4-hydroxyphenyl)propane, 2,4-bis(4-hydroxyphenyl)-2-methylbutane, 2,2-bis(3-methyl-4-hydroxyphenyl)propane, 2,2-bis(3-chloro-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl)sulphone, bis(4-hydroxyphenyl)sulphone, 1,2-bis[2-(4-hydroxyphenyl)isopropyl]benzene, 1,3-bis[2-(4-hydroxyphenyl)isopropyl]benzene, 1,4-bis[2-(4-hydroxyphenyl)isopropyl]benzene, 1,1-bis(4-hydroxyphenyl)-1-phenylethane, 2,4-bis(4-hydroxyphenyl)-2-methylbutane, 2,2-bis(3,5-dichloro-4-hydroxyphenyl)propane, 2,2-bis(3,5-dibromo-4-hydroxyphenyl)propane, 1,1-bis(4-hydroxyphenyl)-3,3,5-trimethylcyclohexane.

The most preferred diphenols are 1,1-bis(4-hydroxyphenyl)-1-phenylethane, 2,2-bis(4-hydroxyphenyl)propane, 4,4'-dihydroxybiphenyl, 1,1-bis(4-hydroxyphenyl)-3,3,5-trimethyl-cyclohexane, 2,2-bis(3,5-dibromo-4-hydroxyphenyl)propane and 1,3-bis[2-(4-hydroxyphenyl)isopropyl]benzene.

The suitable diphenols also include mixtures of more than one diphenol; a copolycarbonate would form thereby. The most preferred mixing components are 1,3-bis[2-(4-hydroxyphenyl)isopropyl]benzene, 1,1-bis(4-hydroxyphenyl)-3,3,5-trimethylcyclohexane, 2,2-bis(4-hydroxyphenyl)propane, 4,4'-dihydroxybiphenyl and 2,2-bis(3,5-dibromo-4-hydroxyphenyl)propane.

It is additionally possible to add a branching agent, such as, for example, compounds which contain three functional phenolic OH groups. The non-Newtonian flow behaviour would be enhanced by the branching. The suitable branching agents include phloroglucinol, 3,3-bis(3-methyl-4-hydroxyphenyl)-2-oxo-2,3-dihydroindole, 4,6-dimethyl-2,4,6-tris(4-hydroxyphenyl)hept-2-ene, 4,6-dimethyl-2,4,6-tris(4-hydroxyphenyl)heptane, 1,3,5-tris(4-hydroxyphenyl)benzene, 1,1,1-tris(4-hydroxyphenyl)ethane, tris(4-hydroxyphenyl)phenylmethane, 2,2-bis[4,4-bis(4-hydroxyphenyl)cyclohexyl]propane, 2,4-bis(4-hydroxyphenylisopropyl)phenol, 2,6-bis(2-hydroxy-5'-methylbenzyl)-4-methylphenol, 2-(4-hydroxyphenyl)-2-(2,4-dihydroxyphenyl)propane, hexakis(4-(4-hydroxyphenylisopropyl)phenyl)orthoterephthalate, tetrakis(4-hydroxyphenyl)methane, tetrakis(4-(4-hydroxyphenylisopropyl)phenoxy)methane, 1,4-bis((4',4"-dihydroxytriphenyl)methyl)benzene and isatinbiscresol, pentaerythritol, 2,4-dihydroxybenzoic acid, trimesic acid, cyanuric acid.

Catalysts suitable for the preparation of the polycarbonates according to the invention are, for example, those of the general formula (VII)

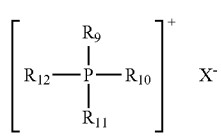
(VII)

in which $R_9$, $R_{10}$, $R_{11}$ and $R_{12}$, independently of one another, may designate the same or different $C_1$- to $C_{18}$-alkylenes, $C_6$- to $C_{10}$-aryls or $C_5$- to $C_6$-cycloalkyls and $X^-$ may represent an anion where the corresponding acid-base pair $H^+ + X^- \rightarrow HX$ has a $pK_b$ of <11.

Preferred catalysts are tetraphenylphosphonium fluoride, tetraphenylphosphonium tetraphenylborate and tetraphenylphosphonium phenolate. Tetraphenylphosphonium phenolate is most preferred. Preferred amounts of phosphonium salt catalysts are, for example, $10^{-2}$ to $10^{-8}$ mol per mole of diphenol and the most preferred amounts of catalyst are $10^{-4}$ to $10^{-6}$ mol per mole of diphenol. Optionally, cocatalysts can be used in addition to the phosphonium salt(s) in order to increase the rate of the polymerization.

Such cocatalysts may be, for example, salts of alkali metals and alkaline earth metals, such as hydroxides, alkoxides and aryl oxides of lithium, sodium and potassium, preferably hydroxide, alkoxide or aryl oxide salts of sodium. Sodium hydroxide and sodium phenolate are most preferred. The amounts of the cocatalyst may be, for example, in the range from 1 to 200 µg/kg, preferably 5 to 150 µg/kg and most preferably 10 to 125 µg/kg, based in each case on the mass of dihydroxydiaryl compound used, calculated in each case as sodium.

The MPCs preferably used according to the invention are preferably prepared without the use of cocatalysts.

The polycarbonates can be prepared stepwise; the temperatures may be in the range from 150 to 400° C. in each step, the residence time may be 15 minutes to 5 hours in each step and the pressures may be 1000 to 0.01 mbar in each step. Particularly preferably, the temperature increases from one step to the other and the pressure decreases from one step to the next. Typically, the phenolic OH values of the MPC are of the order of magnitude of several hundred of mg/kg; in contrast to an IPC whose phenolic OH values are typically in the range from ≤100 mg/kg. Lower contents of phenolic OH terminal groups cannot be directly produced to date industrially in the case of MPC.

The preferably used melt polycarbonates are characterized by the general formula (IV)

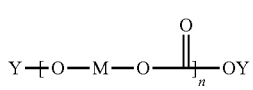
(IV)

in which the square brackets designate repeating structural units, M representing Ar or a polyfunctional compound A, B, C and compound D, it being possible for Ar to be a compound which is represented by formula (VIII) or (IX), preferably (IX)

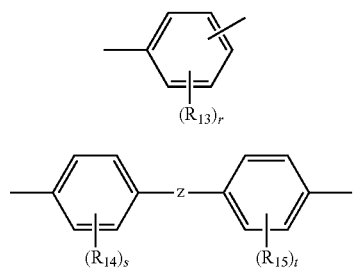

in which

Z is a $C_1$- to $C_8$-alkylidene or $C_5$- to $C_{12}$-cycloalkylidene, S, $SO_2$ or a single bond, $R_{13}$, $R_{14}$, $R_{15}$ independently of one another, is a substituted or unsubstituted $C_1$-$C_{18}$-alkyl radical, preferably a substituted or unsubstituted phenyl, methyl, propyl, ethyl, butyl, Cl or Br, and r, s, t independently of one another, represents 0, 1 or 2, the polyfunctional compound A being a compound of the formula

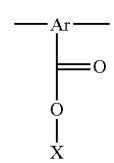
(A)

the polyfunctional compound B being a compound of the formula

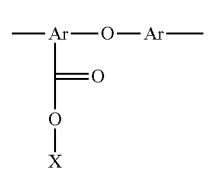
(B)

the polyfunctional compound C being a compound of the formula

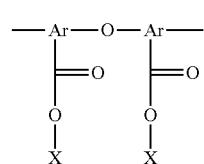
(C)

compound D being a compound of the formula

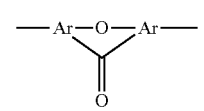
(D)

and the sum of polyfunctional compounds A, B, C and D being ≤5 mg/kg,

Y being H or a compound of the formula (X)

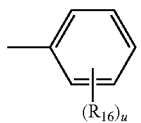
(X)

in which
R$_{16}$ may be identically or differently H, C$_1$- to C$_{20}$-alkyl, C$_6$H$_5$ or C(CH$_3$)$_2$C$_6$H$_5$, and
u may be 0, 1, 2 or 3,
X being Y or —[MOCOO]$_n$—Y, M and Y having the abovementioned meaning.

The polycarbonate used according to the invention may have a weight average molecular weight, determined by gel permeation chromatography, of 5000 to 80 000, preferably 10 000 to 60 000 and most preferably 15 000 to 40 000.

Preferably, Ar has the following meaning:

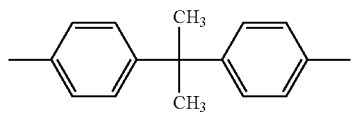

Preferably, the polyfunctional compound A is the compound A1:

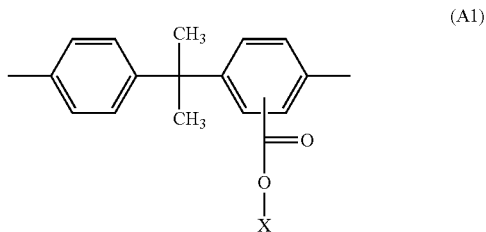
(A1)

Preferably, the compound B is the compound B1:

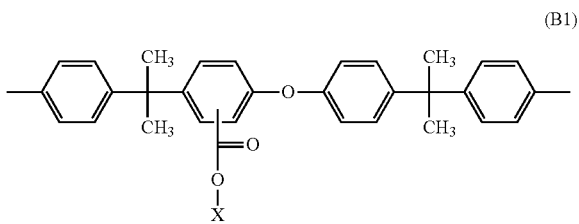
(B1)

Preferably, the polyfunctional compound C is the compound C1:

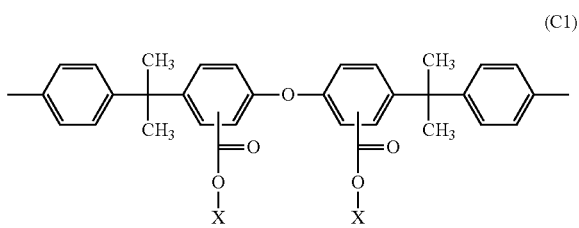
(C1)

In the compounds A1, B1 and C1, X has the abovementioned meaning. Preferably, the compound D is the compound D1:

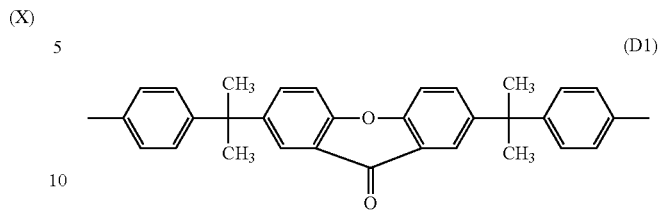
(D1)

The melt polycarbonates described above are mentioned only by way of example. The proportions of the components A to D are present in total in amounts of ≥5 mg/kg in the melt polycarbonate. The concentration of the compounds A1, B1, C1 and D1 is determined by alkaline hydrolysis of the polycarbonate and subsequent analysis of the hydrolysis product by HPLC. The compounds are characterized by nuclear magnetic resonance spectroscopy.

The compositions according to the invention (melt polycarbonate moulding materials) can be prepared, for example, by mixing the respective constituents in a known manner and subjecting them to melt compounding and melt extrusion at temperatures of 200° C. to 400° C. in customary aggregates, such as internal kneaders, extruders and twin-screw apparatuses. Mixing the individual constituents can be effected either successively or simultaneously and either at about 20° C. (room temperature) or at higher temperature. The compounds used according to the invention can, however, also be introduced separately in different stages of the preparation process into the melt polycarbonate moulding material. Thus, for example, the alkyl phosphate and/or the phosphine can be introduced during or at the end of the transesterification of bisphenols with organic carbonates, before or during the formation of oligomeric polycarbonates or before or after the polycondensation of the MPC oligomers into the melt polycarbonate, before a sterically hindered phenol is added. Optionally, the sterically hindered phenol can also be metered as a prepared mixture together with the phosphine and/or with the alkyl phosphate into the MPC at any desired point. A reversal of the above sequence for metering of the components is also possible.

The form of addition of the compounds according to the invention is not limited. The compounds according to the invention or mixtures of the compounds according to the invention can be added as solids, for example as powder, as concentrate in polycarbonate powder in solution or as a melt to the polymer melt. Preferably, the metering of the organic phosphorus compounds and the sterically hindered phenol is effected via a melt metering pump or a side extruder behind the last polycondensation step. In industrial embodiments, a side extruder is particularly preferably operated with a throughput of, for example, 200-1000 kg of polycarbonate per hour.

In a preferred embodiment, the optional metering of alkyl phosphates is effected, for example at room temperature in liquid form together with polycarbonate into the hopper of the polycarbonate feed of the side extruder. The amount of alkyl phosphate is metered, for example, with the aid of a diaphragm pump or of another suitable pump. The addition of phosphines or mixtures of phosphines with sterically hindered phenol is preferably effected in liquid form at a temperature of about 80 to 250° C. behind the hopper of the polycarbonate feed into an extruder zone which is equipped with mixing elements. The removal of the phosphines or of the mixture of phosphines with sterically hindered phenol is effected from a ring pipe which is preferably kept at a pressure of 2-20 bar, preferably at a temperature of 80-250° C. The added amount can be controlled via a control valve.

In a particularly preferred embodiment, a static mixer is present behind the side extruder and all additive metering points in order to ensure thorough mixing of all additives. The polycarbonate melt of the side extruder is then introduced into the polycarbonate main melt stream. The mixing of the main melt stream with the melt stream of the side extruder is effected via a further static mixer.

As an alternative to liquid metering, the phosphines and sterically hindered phenols can be metered in the form of a masterbatch (concentrate of the additives in polycarbonate) or in pure, solid form via the hopper of the polycarbonate feed of the side extruder. Such a masterbatch may contain further additives.

All additives can also be subsequently introduced into the polycarbonate, for example by compounding.

The moulding materials according to the invention can be used for the production of mouldings of all kinds. These can be produced, for example by injection moulding, extrusion or blow moulding processes. A further form of processing is the production of mouldings by thermal forming from previously produced sheets or films.

Examples of the mouldings according to the invention are profiles, films, housing parts of any kind, for example for household appliances, such as juice presses, coffee machines, mixers; for office machines, such as monitors, printers, copiers; for sheets, pipes, electrical installation ducts, windows, doors and profiles for the construction sector, interior finishing and exterior applications; in the area of electrical engineering, for example of switches and plugs. Furthermore, the mouldings according to the invention can be used for interior finishing parts and components of railway vehicles, ships, aircraft, buses and other motor vehicles and for truck bodywork parts.

The mouldings according to the invention may be transparent, translucent or opaque. Further mouldings are in particular optical and magnetooptical data stores, such as mini disc, compact disc (CD) or digital versatile disc (DVD), food and beverage packagings, optical lenses and prisms, lenses for illumination purposes, automotive headlight lenses, glazing for construction vehicles and motor vehicles, panes of all kinds, such as for greenhouses, so-called double-skinned sheets or hollow-chamber sheets.

All the references described above are incorporated by reference in their entireties for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

EXAMPLES

The following examples explain the invention but without limiting it thereby.

Phenolic OH Terminal Groups

The content of phenolic OH terminal groups was determined by the titanium(IV) chloride method (A. Horbach, U. Veiel and H. Wunderlich, "Endgruppenbestimmung an aromatischen Polycarbonaten [Terminal group determination on aromatic polycarbonates]", Die Makromolekulare Chemie, 88, 215-231, 1965).

The phenolic OH terminal groups are specified in mg (OH) per kg of polycarbonate.

Compounds A1, B1, C1 and D1

The determination of the concentration of the compounds A1, B1, C1 and D1 is effected by alkaline hydrolysis of the polycarbonate and subsequent analysis of the hydrolysis product by HPLC. The compounds were characterized by nuclear magnetic resonance spectroscopy.

YI and Subsequent Yellowing ($\Delta$YI)

The determination of the optical properties of the moulding materials according to the invention is effected by measuring the so-called yellowness index (YI) on standard test specimens according to ASTM E313. These standard test specimens are colour sample panels (60×40×4 mm) which were produced from the MPC compositions at a melt temperature of 300° C. and a mould temperature of 90° C. The subsequent yellowing ($\Delta$YI) is determined as the difference between the measured YI value of the freshly injection-moulded colour sample panels and the measured YI value of the same colour sample panels after thermal storage.

Thermal Storage

For thermal storage, standard polycarbonate test specimens (60×40×4 mm) are stored in an air circulating oven for 1000 hours at 135° C. The YI is then determined according to ASTM E313. The difference relative to the zero sample (before storage) is calculated (=$\Delta$YI 1000 h).

MVR

The determination of the melt volume flow rate (MVR) is effected at 300° C. and 1.2 kg load using a melt index tester according to ISO 1133.

Preparation of the MPC Compositions According to the Invention

The compounds according to the invention were prepared on an EV32HT extruder from Clextral, with a throughput of 50 kg/h. The melt temperature was 320° C. The various additives were metered in the form of a powder mixture with polycarbonate powder (PC 2, see under raw materials used) ~5% by weight, based on the total weight taken.

Raw Materials Used:

TPP: Triphenylphosphine

Irgafos 168: Tris(2,4-tert-butylphenyl) phosphite

Irganox 1076: n-Octadecyl-3-(3,5-di-tert-butyl-4-hydroxyphenyl)propionate

Irgafos B900: Mixture of four parts of Irgafos 168 and one part of Irganox 1076

Irganox 1010: Pentaerythrityl 4-hydroxy-3,5-di-tert-butylphenylpropionate

Irganox 1035: Thiodiethylene bis[3-(3,5-di-tert-butyl-4-hydroxyphenyl)propionate Doverphos S9228: Bis(2,4-dicumylphenyl)pentaerythrityl diphosphite PC 1 (MPC) is a polycarbonate without additives, based on bisphenol A and DPC, having a melt volume flow rate (MVR)

of 11.4 cm³/10 min (300° C./1.2 kg). Polyfunctional compounds A1: 370 ppm, B1: 35 ppm, C1: 11 ppm, D1: 67 ppm. The content of phenolic OH terminal groups is 330 mg/kg.

PC 2 (IPC) is a polycarbonate without additives, based on bisphenol A, having an MVR of 19 cm³/10 min (300° C./1.2 kg) in powder form; it serves for the preparation of homogeneous powder concentrates of the solid and liquid additives in polycarbonate. Polyfunctional compounds A, B, C and D below the limit of detection.

Table 1 shows the various compositions of the examples and initial YI values in the freshly injection-moulded state and the subsequent yellowing value ΔYI after storage for 1000 h at 135° C. in air. Examples according to the invention are Examples 3, 13, 14 and 21. The other examples serve for comparison.

As shown by the examples, the initial YI value of the MPC compounds in the freshly injection-moulded state with the use of heat stabilizers is in principle better than without the use of heat stabilizers. This is evident from the comparison of Examples 2-11 and 13-21 with Examples 1 and 12. However, the subsequent yellowing ΔYI after storage for 1000 h at 135° C. in air is not correlated with the initial YI values and for this reason is therefore not predictable. The correlation coefficient for the linear regression of the plot of ΔYI against YI zero value is only $r^2=0.001$ and proves that no correlation of these two variables is present.

Examples 3, 13, 14 and 21 according to the invention show the lowest subsequent yellowing on thermal storage in comparison with all MPC-based combinations tested. Only the ΔYI values of Examples 3, 13, 14 and 21 according to the invention are ΔYI <4.8 after 1000 h.

Surprisingly, the combination of phosphine with n-octadecyl 3-(3,5-di-tert-butyl-4-hydroxyphenyl)propionate (Examples 3, 13, 14 and 21) are superior to the combinations of phosphite and n-octadecyl-3-(3,5-di-tert-butyl-4-hydroxyphenyl)propionate (Examples 8, 9 and 10) with regard to the subsequent yellowing in the case of the melt polycarbonate. Example 10 even surprisingly shows a deterioration in the subsequent yellowing in the case of the combination of phosphites with sterically hindered phenol in comparison with the sample without stabilizer.

TABLE 1

Combinations of heat stabilizers and YI zero values and ΔYI after storage for 1000 h at 135° C. in air:

| Example | 1 | 2 | 3, inv. | 4 | 5 | 6 | 7 | 8 | 9 | 10 | 11 |
|---|---|---|---|---|---|---|---|---|---|---|---|
| PC1 [%] | 95 | 95 | 95 | 95 | 95 | 95 | 95 | 95 | 95 | 95 | 95 |
| PC2 powder [%] | 5 | 4.975 | 4.960 | 4.9672 | 4.9835 | 4.9567 | 4.9595 | 4.9411 | 4.9705 | 4.952 | 4.9388 |
| TPP [%] | | 0.025 | 0.025 | 0.0125 | 0.0063 | 0.0125 | | | | | |
| Irgafos 168 [%] | | | | | | | 0.0308 | | | | 0.0612 |
| Irgafos B900 [%] | | | | | | | | | 0.0386 | 0.0193 | |
| Irganox 1076 [%] | | | 0.015 | | | | | | | 0.0075 | |
| Irganox 1010 [%] | | | | | | | | | | | |
| Irganox 1035 [%] | | | | | | | | | | | |
| Doverphos S9228 [%] | | | | 0.0203 | 0.0102 | | | 0.0405 | 0.0203 | 0.0102 | 0.0405 |
| YI, 0 h | 3.31 | 2.12 | 1.67 | 1.75 | 1.97 | 1.68 | 2.70 | 2.19 | 2.61 | 2.42 | 2.22 |
| ΔYI, 1000 h | 7.3 | 8.1 | 3.5 | 6.2 | 6.5 | 5.8 | 10.4 | 4.8 | 5.3 | 9.5 | 5.6 |

| Example | 12 | 13, inv. | 14, inv. | 15 | 16 | 17 | 18 | 19 | 20 | 21, inv. |
|---|---|---|---|---|---|---|---|---|---|---|
| PC1 [%] | 95 | 95 | 95 | 95 | 95 | 95 | 95 | 95 | 95 | 95 |
| PC2 powder [%] | 5 | 4.960 | 4.945 | 4.960 | 4.945 | 4.960 | 4.945 | 4.955 | 4.955 | 4.955 |
| TPP [%] | | 0.025 | 0.025 | 0.025 | 0.025 | 0.025 | 0.025 | 0.015 | 0.015 | 0.015 |
| Irgafos 168 [%] | | | | | | | | | | |
| Irgafos B900 [%] | | | | | | | | | | |
| Irganox 1076 [%] | | 0.015 | 0.03 | | | | | | | 0.03 |
| Irganox 1010 [%] | | | | 0.015 | 0.03 | | | | 0.03 | |
| Irganox 1035 [%] | | | | | | 0.015 | 0.03 | 0.03 | | |
| Doverphos S9228 [%] | | | | | | | | | | |
| YI, 0 h | 3.18 | 2.05 | 2.11 | 2.03 | 1.96 | 1.92 | 1.98 | 2.05 | 2.10 | 2.36 |
| ΔYI, 1000 h | 7.2 | 3.8 | 3.9 | 5.2 | 6.3 | 11.9 | 21.3 | 23.8 | 6.3 | 3.9 |

Examples 1-11: first experimental series.
Examples 12-21: second experimental series
Example 12 is a reproduction of Example 1;
Example 13 is a reproduction of Example 3.

The invention claimed is:

1. A composition comprising a melt polycarbonate, and a composition for stabilization of heat ageing comprising at least one phosphine, and n-octadecyl-3-(3,5-di-tert-butyl-4-hydroxyphenyl)propionate employed in an amount of from 10 to 800 mg/kg, based on the total weight of the composition, wherein said at least one phosphine is a compound of formula (I):

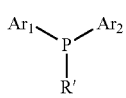
(I)

wherein $Ar_1$ and $Ar_2$ are, identically or differently, optionally substituted aryl radicals, and R' is an optionally substituted aryl radical or a radical of formula (Ia) to (Ih)

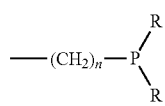
(Ia)

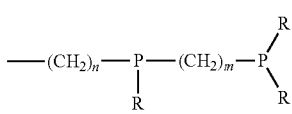
(Ib)

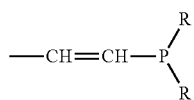
(Ic)

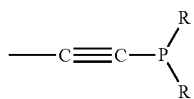
(Id)

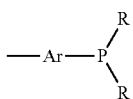
(Ie)

where Ar = R ($C_6$-$C_{14}$-aryl radical)

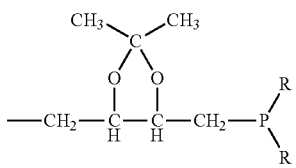
(If)

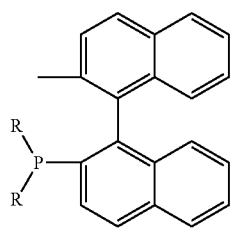
(Ig)

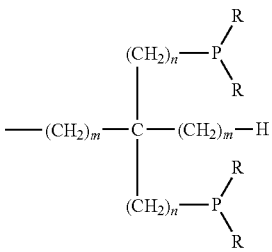
(Ih)

wherein

R is an optionally substituted $C_6$-$C_{14}$-aryl radical, n and m
are, independently of one another, an integer from 1 to 7, wherein the H atoms of the radicals of formula (Ia) to (Ic) are optionally replaced by substituents, and with the proviso that R' is optionally an optionally substituted 4-phenylphenyl or an optionally substituted α-naphthyl if Ar in formula (I) is in both cases likewise an optionally substituted 4-phenylphenyl or an optionally substituted α-naphthyl, at least one alkyl phosphate, wherein said at least one alkyl phosphate is a compound of formula (II):

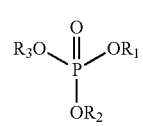
(II)

wherein $R_1$, $R_2$, and $R_3$ are, identically or differently, H or a linear, branched, or cyclic alkyl radical, employed in an amount of from 0.5 to 500 mg/kg, based on the total weight of said composition, and wherein the composition has a subsequent yellowing ΔYI, after storage for 1000 hours at 135° C. in air, of less than 4.8.

2. The composition of claim 1, wherein said melt polycarbonate comprises a melt polycarbonate of formula (IV)

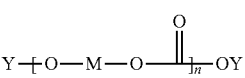
(IV)

wherein the square brackets designate repeating structural units,

M is Ar, a polyfunctional compound A, B, or C, or a compound D, wherein Ar is optionally a compound of formula (VIII) or (IX)

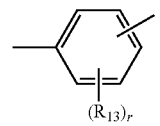
(VIII)

-continued

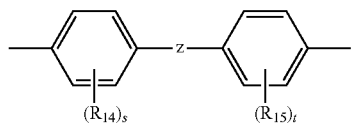

(IX)

wherein

Z is $C_1$- to $C_8$-alkylidene, $C_5$- to $C_{12}$-cycloalkylidene, S, $SO_2$, or a single bond, $R_{13}$, $R_{14}$, and $R_{15}$ are, independently of one another, an optionally substituted C1-C18 alkyl radical, Cl, or Br, n is 0, 1, or 2, r, s, and t are, independently of one another, 0, 1, 2, or 3, polyfunctional compound A is a compound of formula

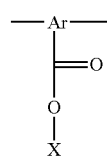

(A)

polyfunctional compound B is a compound of formula

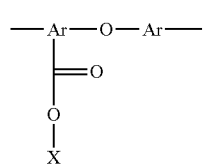

(B)

polyfunctional compound C is a compound of formula

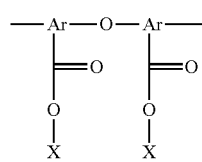

(C)

compound D is a compound of formula

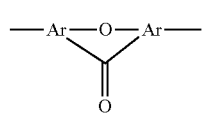

(D)

wherein the sum of said polyfunctional compounds A, B, and C and compound D is greater than or equal to 5 mg/kg, X is Y or -[MOCOO]$_n$—Y, Y is H or a compound of formula (X)

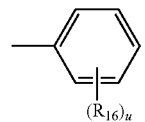

(X)

wherein $R_{16}$ is, identically or differently, H, $C_1$- to $C_{20}$-alkyl, $C_6H_5$, or $C(CH_3)_2C_6H_5$ and u is 0, 1, 2 or 3.

3. The composition of claim 2, wherein said optionally substituted C1-C18 alkyl radical is a phenyl, methyl, propyl, ethyl, or butyl group, each of which is optionally substituted.

4. The composition of claim 1, wherein said composition further comprises at least one phosphine oxide corresponding to said at least one phosphine of formula (I).

5. The composition of claim 1, wherein said at least one phosphine of formula (I) is triphenylphosphine.

6. The composition of claim 1, wherein said at least one phosphine of formula (I) is employed in an amount of from 10 to 2000 mg/kg, based on the total weight of said composition.

7. A process for preparing the composition of claim 1, comprising preparing said melt polycarbonate via the melt transesterification reaction of a bisphenol and a carbonic acid diester.

8. A process for preparing the composition of claim 1, comprising preparing said melt polycarbonate via the condensation of carbonate oligomers comprising hydroxyl and/or carbonate terminal groups, bisphenols, and carbonic diesters.

9. A process for preparing the composition of claim 1, comprising adding an additive to the melt of a polycarbonate melt stream via a side extruder behind the last polycondensation step of a multi-step polycondensation to form a mixture and mixing said mixture in a static mixer.

10. A process for preparing the composition of claim 1, comprising adding a prepared mixture of said phosphine with n-octadecyl-3-(3,5-di-tert-butyl-4-hydroxyphenyl)propionate to the melt of a polycarbonate melt stream via a side extruder behind the last polycondensation step of a multi-step polycondensation to form a mixture and mixing said mixture in a static mixer.

11. The process of claim 10, wherein said mixture is added in liquid form.

12. A moulding comprising the composition of claim 1.

13. A process for preparing a composition comprising preparing a melt polycarbonate via the melt transesterification reaction of a bisphenol and a carbonic acid diester, wherein the composition comprises a melt polycarbonate, and a composition for stabilization of heat ageing comprising at least one phosphine, and n-octadecyl-3-(3,5-di-tert-butyl-4-hydroxyphenyl)propionate employed in an amount of from 10 to 800 mg/kg, based on the total weight of the composition, wherein said at least one phosphine is a compound of formula (I):

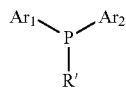 (I)

wherein
- $Ar_1$ and $Ar_2$ are, identically or differently, optionally substituted aryl radicals, and
- R' is an optionally substituted aryl radical or a radical of formula (Ia) to (Ih)

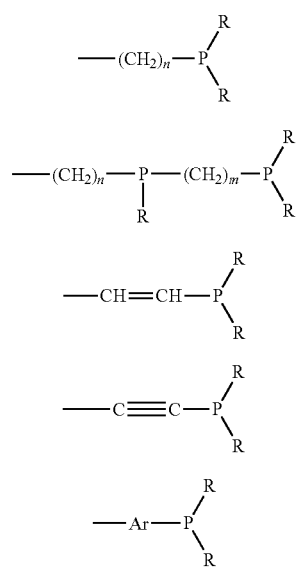

where Ar = R ($C_6$-$C_{14}$-aryl radical)

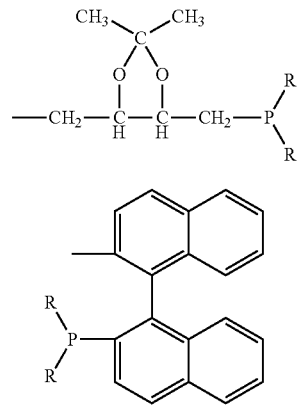

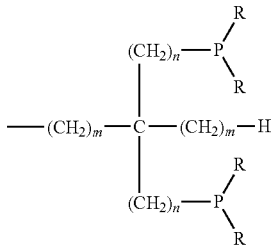

wherein
- R is an optionally substituted $C_6$-$C_{14}$-aryl radical,
- n and m are, independently of one another, an integer from 1 to 7,
- wherein the H atoms of the radicals of formula (Ia) to (Ic) are optionally replaced by substituents, and
- with the proviso that R' is optionally an optionally substituted 4-phenylphenyl or an optionally substituted α-naphthyl if Ar in formula (I) is in both cases likewise an optionally substituted 4-phenylphenyl or an optionally substituted α-naphthyl,
- at least one alkyl phosphate, wherein said at least one alkyl phosphate is a compound of formula (II):

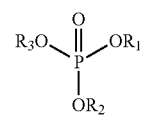 (II)

wherein $R_1$, $R_2$, and $R_3$ are, identically or differently, H or a linear, branched, or cyclic alkyl radical, employed in an amount of from 0.5 to 500 mg/kg, based on the total weight of said composition, and wherein said composition has a subsequent yellowing ΔYI, after storage for 1000 hours at 135° C. in air, of less than 4.8.

* * * * *